United States Patent [19]
Alvarez

[11] Patent Number: 4,875,395
[45] Date of Patent: Oct. 24, 1989

[54] DUAL WHEEL LUG NUT TOOL
[76] Inventor: Isaac Alvarez, 3000 Airline Hwy., Hollister, Calif. 95023
[21] Appl. No.: 230,519
[22] Filed: Aug. 10, 1988
[51] Int. Cl.$^4$ .............................................. B25B 9/00
[52] U.S. Cl. ........................................ 81/13; 411/119
[58] Field of Search ................... 81/13, 55, 10, 121.1, 81/124.3, 124.4, 124.7; 411/116, 119

[56] References Cited
U.S. PATENT DOCUMENTS

| | | | |
|---|---|---|---|
| 2,287,233 | 6/1942 | Ford | 81/13 |
| 2,305,274 | 12/1942 | Power | 81/13 |
| 2,387,545 | 10/1945 | Veney | 81/13 |
| 3,170,347 | 2/1965 | Brye | 81/13 |
| 4,191,235 | 3/1980 | Davis | 81/13 |

Primary Examiner—Roscoe V. Parker
Attorney, Agent, or Firm—Leon Gilden

[57] ABSTRACT

A dual wheel lug nut tool is set forth for use in removal of a stud and nut arrangment typically utilized in dual wheel securement to an associated axle. The lug nut tool is formed with a through extending wrench opening of dimension to correspond to an associated lug nut at one end with an orthogoanlly extending stud at the other end extending at an axis parallel to the wrench opening. The stud is positioned through an adjacent opening in a wheel to secure a lug nut with a wing nut securable to the projecting stud therethrough with the socket securing the lug nut in a non-slippage manner to prevent marring of the associated wheel.

6 Claims, 1 Drawing Sheet

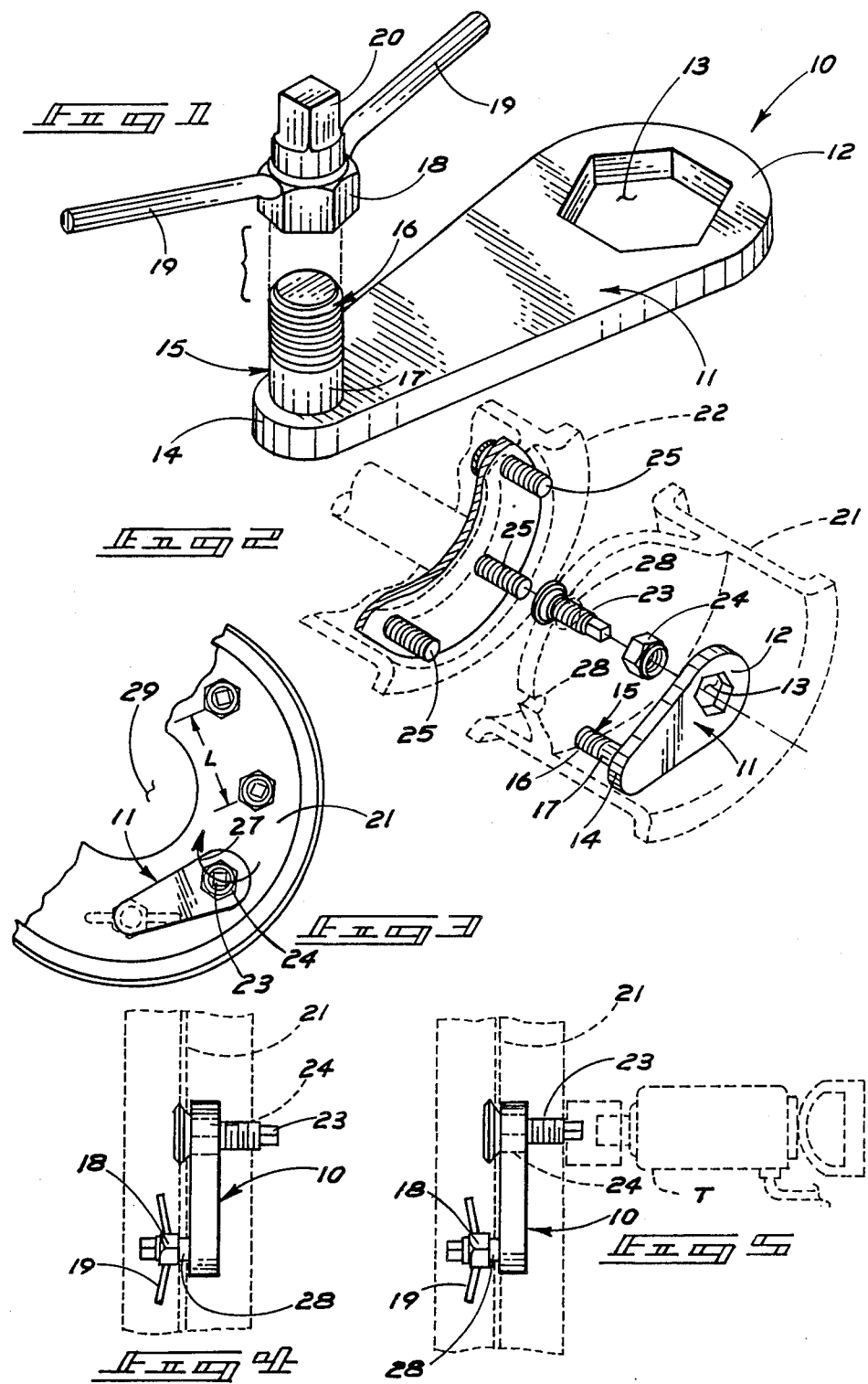

DUAL WHEEL LUG NUT TOOL

BACKGROUND OF THE INVENTION

1. Field of the Invention

The field of invention relates to tire changing tools, and more particularly pertains to a new and improved dual wheel lug nut tool that is securable to an associated stud lug nut at one end and securable through the wheel at the other end of the tool to prevent slippage of the tool and associated marring of a wheel

2. Description of the Prior Art

The use of various tools for removal of lug nuts and the like as associated with automotive wheels is well known in the prior art. Where dual wheels are utilized in truck environments, occasionally an associated lug nut arrangement for securement of dual wheels is inadvertently secured to an exterior of the dual wheels where a lug nut and an associated internally threaded lug utilized in such applications remains attached to an exterior wheel of a dual wheel arrangement. Vehicles of this type frequently utilize polished or chrome-type wheels for enhanced appearance where it is extremely undesirable to allow slippage of tools that may come in contact with such wheels' surfaces during a wheel changing operation.

Prior art apparatus that is utilized in wheel changing operations and in various torque applying applications have a history of availability in the prior art. For example, an early example of a U.S. patent to Van Hoesen, Pat. No. 30,268, sets forth a wagon wrench tool wherein a main body has a socket projecting from one end outwardly from a first face with a handle at a second end projecting outwardly from a second face for providing a mechanical advantage in the removal and application of nuts, as may be applied to wagon wheels.

U.S. Pat. No. 279,993 to True sets forth a wrench arrangement provided with a central socket with a axially formed handle thereto and a pair of extending levers directed outwardly to either side of said socket to provide a desired mechanical advantage in a levering procedure in association with a carriage wrench.

U.S. Pat. No. 601,146 to Johnson sets forth a ratchet wrench arrangement wherein a socket is formed with an offset handle curvilinearly oriented and terminating in an axially oriented arrangement relative to the socket with a lever orthogonally secured to the handle to provide a desired torquing capacity to the wrench arrangement.

U.S. Pat. No. 2,372,888 to Duggan is set forth as interest relative to a nut structure of anti-vibration characteristic that may be typically utilized in environments requiring use of such arrangements and is ostensively of interest relative to its potential application in automotive environments.

U.S. Pat. No. 3,531,808 to McCue sets forth a movement indicator tool with an integrally mounted spirit level is capable of accurately indicating predetermined increments of adjustment of a rotatable torquing member.

U.S. Pat. No. 3,715,168 to Kahn sets forth a die stock holder and extension with an included die stock for supporting a thread cutting die engageable directly to a socket wrench or to an elongate extension which in turn is engaged to a socket wrench.

U.S. Pat. No. 3,787,948 to Runge sets forth a wrench for splicing electrical wires by use of an electrical connector wherein an elongate extension directed outwardly of one portion of the wrench body is rotatable in combination with a wrench body to enable rotation of an electrical connector within a socket of the wrench body.

Furthermore, there are available tools utilized in truck wheel removal applications with sockets dimensioned to correspond to lug nuts of the associated truck wheel, but available prior art does not provide a means for fixedly securing a socket in relation to a wheel during a lug nut removal procedure to prevent marring of the associated wheel.

As such, it may be appreciated that there is a continuing need for a new and improved dual wheel lug nut tool that addresses both the problem of effectiveness and ease of use, and in this respect the present invention substantially fulfills this need.

SUMMARY OF THE INVENTION

In view of the foregoing disadvantages inherent in the known types of lug nut tools now present in the prior art, the present invention provides a dual wheel lug nut tool wherein the same may be fixedly and easily secured to a lug nut and an associated tire wheel to prevent marring of the tire wheel during use and may thereafter be readily removed subsequent to use. As such, the general purpose of the present invention, which will be described subsequently in greater detail, is to provide a new and improved dual wheel lug nut tool which has all the advantages of the prior art lug nut tools and none of the disadvantages.

To attain this, the present invention comprises an elongate planar body formed with a socket at the first end corresponding to a wheel lug nut with a threaded boss extending orthogonally relative to the body at the second remote end with threads terminating to provide a smooth boss provide for interengagement with an interior defined opening of an associated wheel wherein an associated wing nut may be threadedly secured to the boss to fixedly secure the tool to the wheel during use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection of the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dual wheel lug nut tool which has all the advantages of the prior art lug nut tools and none of the disadvantages.

It is another object of the present invention to provide a new and improved dual wheel lug nut tool which may be easily and efficiently manufactured and marketed.

It is a further object of the present invention to provide a new and improved dual wheel lug nut tool which is of a durable and reliable construction.

An even further object of the present invention is to provide a new and improved dual wheel lug nut tool which is susceptible of a low cost of manufacture with regard to both materials and labor, and which accordingly is then susceptible of low prices of sale to the consuming public, thereby making such dual wheel lug nut tools economically available to the buying public.

Still yet another object of the present invention is to provide a new and improved dual wheel lug nut tool which provides in the apparatuses and methods of the prior art some of the advantages thereof, while simultaneously overcoming some of the disadvantages normally associated therewith.

Still another object of the present invention is to provide a new and improved dual wheel lug nut tool formed with a socket end securable to an associated lug nut with a threaded boss extending orthogonally to an elongate body at a distance corresponding to adjacent openings in an associated wheel to enable projection of the boss through an associated opening while the tool secures an adjacent lug nut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an expanded isometric illustration illustrating the tool in association in a working environment.

FIG. 3 is an orthographic view taken in elevation of the tool secured to an associated wheel.

FIG. 4 is an orthographic view taken in cross-section of the tool secured to an associated wheel.

FIG. 5 is an orthographic cross-sectional view illustrating the tool in use.

DESCRIPTION OF THE PREFERRED EMBODIMENT

With reference now to the drawings, and in particular to FIG. 1 thereof, a new and improved dual wheel lug nut tool embodying the principles and concepts of the present invention and generally designated by the reference numeral 10 will be described.

More specifically, it will be noted that the dual wheel lug nut tool 10 apparatus essentially comprises a wrench body 11 formed with a first end 12 including a wrench opening 13 orthogonally directed therethrough tapering downwardly to a second end 14 formed with an upstanding boss 15 orthogonally and integrally secured to a top surface of the wrench body 11. The upstanding boss 14 is formed with a threaded upper end 16 and a smooth or unthreaded lowermost end 17 unthreaded a longitudinal extent to approximately equal the thickness of web 21 of a typical wheel, as utilized in a dual wheel truck arrangements.

An internally threaded nut 18 is formed with threads of an axially extent at least equal to or greater than the axial extent of the threaded upper end 16 of boss 15. The nut is formed with a plurality of wing levers 19 to either side of the nut 18 and oriented or angled upwardly relative to the nut 18 to insure clearance when secured to the boss 15 in use, as illustrated in FIG. 4 and 5 for example. Finally, a plurality of wrench flats 20 are coaxially formed relative to the nut 18 to enable securement of a wrench or socket thereover in the event that sufficient torque cannot readily be applied to the wing levers 19 in manual use of the tool 10.

In use, an interior wheel web 22 is secured onto the axle studs 25 of a typical truck axle whereupon an internally and externally threaded first nut 23 is secured over each of the axle studs 25 to secure the first wheel to an associated axle. A second or exterior wheel web 21 is thereupon positioned over the nut 23 whereupon a second internally threaded nut 24 is threaded onto the first nut 23 to secure the web of the exterior wheel 21 thereon.

Frequently when removing the second nut 24, the first nut 23 for various reasons, such as corrosion or dirt intrusion between the first and second nuts 23 and 24, may unthread itself from the respective axle stud 25 and is thereby removed from the axle stud 25 in unison with the second nut 24.

Thereupon, the tool 10 is positioned with the wrench opening 13 over the second nut 24. The length between the central axis of the wrench opening 13 and the boss 15 is of a length "L" equal to the length between axes of respective openings within a wheel web, such as 21, whereby upon positioning the wrench 13 over associated nut 24, the boss 15 will be directed through an adjacent opening 28 of the wheel web 21. Thereafter, the internally threaded nut 18 may be rotated and secured over the boss 15, as illustrated in FIG. 5. The tool 10 is at that juncture fixedly secured in position relative to the web 21 and upon a torquing tool "T" torquing the nut 24 in the direction of second arrow 27, the wrench is unable to move relative to wheel web 21 preventing any marring or scratching of the surface of the wheel web 21. The clockwise rotation of the first nut 23 in the direction of arrow 27 enables the nut 23 to be unthreaded from within the second nut 24 and thereby conveniently and easily separating the two nuts relative each other.

The manner of usage and operation therefore of the instant invention should be apparent from the above description, and accordingly no further discussion relative to the manner of usage and operation of the instant invention shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual wheel lug nut tool for securement of a first internally threaded lug nut relative to a second internally and externally threaded elongate lug nut to an automotive wheel rim wherein said wheel rim includes a plurality of radially spaced openings for receiving a plurality of said second nuts therethrough, said tool comprising an elongate body including a top and bottom planar surface, and a wrench opening means for securement of said first lug nut orthogonally directed through a first end of said body, and an exteriorly threaded boss member orthogonally and integrally directed outwardly of the top surface of said elongate body, and an interiorly threaded nut means formed with complementary threads relative to said boss member for selective threaded securement to said boss member.

2. A dual wheel lug nut tool as set forth in claim 1 wherein said boss member includes a smooth unthreaded portion proximate said top surface of an axial length approximately equal to that of a thickness defined by said wheel rim.

3. A dual wheel lug nut tool as set forth in claim 2 wherein the axial distance between said wrench opening and said boss member substantially equals a distance defined between adjacent of said radially spaced openings of said wheel rim.

4. A dual wheel lug nut tool as set forth in claim 3 wherein said nut means is provided with a threaded interior of an axial length substantially equal or greater than the axial length of threads defining the exteriorly threaded portion of said boss member.

5. A dual wheel lug nut tool as set forth in claim 2 wherein said nut means includes a plurality of wing levers positioned on opposite sides of said nut means, said wing levers are integrally secured to said nut means and angularly directed upwardly from respective vertical surfaces of said nut means.

6. A dual wheel lug nut tool as set forth in claim 5 wherein an axial center line of said wrench opening and an axial center line of said boss member are parallel.

* * * * *